United States Patent [19]
Melchert, Jr. et al.

[11] 3,805,722
[45] Apr. 23, 1974

[54] BOAT RACK

[76] Inventors: Carl F. Melchert, Jr.; Charles L. Melchert, both of 3121 Metairie Rd., Metairie, La. 70001

[22] Filed: July 26, 1972

[21] Appl. No.: 275,444

[52] U.S. Cl. .................................. 114/.5 R, 9/1 R
[51] Int. Cl. ............................................ B63b 35/00
[58] Field of Search .................. 114/.5 R, .5 A, 219; 9/1 R, 400

[56] References Cited
UNITED STATES PATENTS
3,613,137  10/1971  Eccles .................................... 9/1 R
3,587,123   6/1971  O'Boyle ................................. 9/400
FOREIGN PATENTS OR APPLICATIONS
39,965  10/1924  Norway ............................. 114/.5 R

*Primary Examiner*—Milton Buchler
*Assistant Examiner*—Stuart M. Goldstein
*Attorney, Agent, or Firm*—Scrivener Parker Scrivener & Clarke

[57] ABSTRACT

A rack is disclosed for supporting a fish net rearwardly from the stern of a fishing boat, whereby the contents of the fish net may be sorted and brought aboard the fishing boat. The rack includes a horizontal rectangular frame connected with the stern of the boat along the forward edge portion of the frame, said frame being maintained in a horizontal position by a pair of longitudinally extending struts. In one embodiment adapted for an inboard type fishing boat, the frame includes a pair of intermediate bars connected with and extending between the forward and rearward edge portions of the frame. In a second embodiment adapted for an outboard type fishing boat, the frame contains a rearwwardly extending recess for receiving an outboard motor and the forward edge portion of the frame is connected to the struts by a pair of vertical connecting rods including a rigid shoulder portion positioined to engage the lower edge portion of a central recess in the boat stern, whereby a three point support is provided on each side of the rack.

1 Claim, 4 Drawing Figures

PATENTED APR 23 1974
3,805,722
SHEET 2 OF 2
Fig. 3
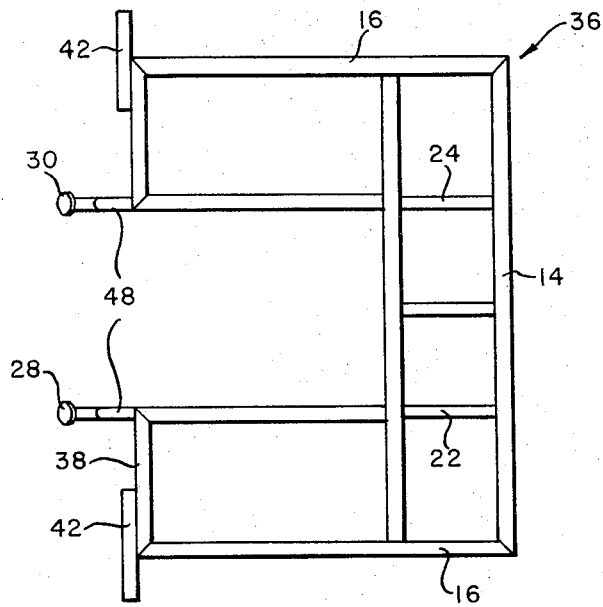
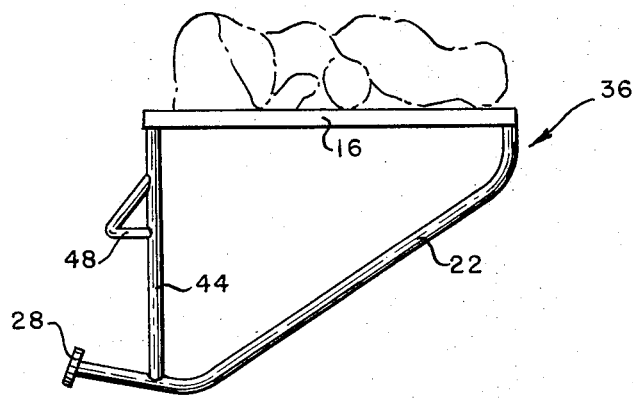
Fig. 4

BOAT RACK

This invention relates to a rack for supporting a fish net rearwardly from the stern of a fishing boat. Heretofore, the practice of fishing with a trawling net has required the net to be hauled into the boat over the side either by hand or by a special winch adapted to automatically reel in the net. U.S. Pats. Nos. to Luketa, No. 3,070,916, issued Jan. 1, 1963, and No. 3,184,080, issued May 18, 1965, disclose such apparatus for handling trawl nets, wherein a ramp structure is provided which projects aft of and outboard from the stern of a trawler to guide the net as it is hauled into the trawler. While such apparatus is satisfactory for the purpose intended, its expense and size make it impractical for use on small pleasure boats. Accordingly, it has generally been the practice on small boats to haul in trawl nets manually, thereby causing the sides and stern of the boat to become scratched and marred as the net slides over the upper edge of the boat. Furthermore, sorting the contents of a loaded fish net after it has been brought aboard necessitates a significant cleanup operation to remove the unwanted fish and refuse brought aboard by the net.

Accordingly, a primary object of the present invention is to provide a rack extending rearwardly and horizontally from the stern of a boat, said rack being adapted for supporting a loaded fish net, whereby the contents of the net may be sorted and brought aboard the boat without the necessity of hauling the net aboard the boat. The invention is further characterized by the provision of a horizontal rectangular frame connected with the upper edge portion of a boat stern and bracing means including a pair of struts for engaging the lower edge portion of the stern for supporting and maintaining the frame in a horizontal position when subjected to the weight of a loaded fish net.

A more specific object of the invention is the provision of a rack especially adapted for outboard type boats, wherein the horizontal frame contains a rearwardly directed recess for receiving an outboard motor mounted on the stern of the boat and wherein the bracing means includes a pair of vertical connecting rods, each rod connected at its upper end to the forward edge of the frame and at its lower end to one of the struts, respectively. Each vertical connecting rod includes a rigid shoulder portion extending in the forward direction and positioned to engage the lower edge portion of the outboard type boat stern, whereby the rack may engage and be supported by the stern at at least three points on each side of the rack.

Another object of the invention is the provision of a pair of laterally outwardly extending dowels welded to the forward corner portions of the frame, respectively, whereby the dowels may be received in brackets mounted on the boat stern.

Yet another object of the invention is the provision of a pair of disks mounted on the forward extremities of the pair of struts in a position substantially coplanar with the outer surface of the stern, respectively, whereby forces transmitted into the stern from the struts are distributed over an area substantially greater than the cross sectional area of the struts.

Other objects and advantages of the invention will become apparent from a study of the following specification when viewed in light of the accompanying drawings, in which:

FIG. 3 is a top plan view of the boat rack illustrated in FIG. 2; and

FIG. 4 is a side plan view of the boat rack illustrated in FIGS. 2 and 3.

Figure 1:
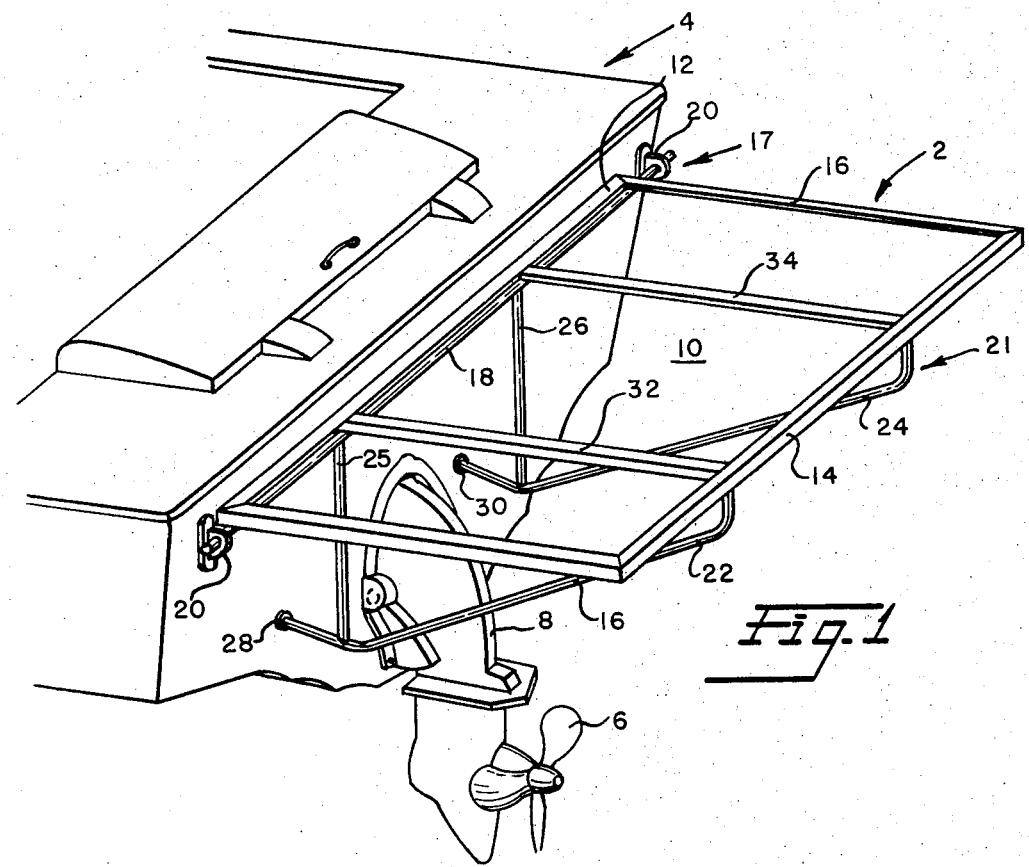
FIG. 1 is a perspective view of a boat rack adapted for mounting on the stern of an inboard-outboard type boat.

The boat rack 2, illustrated in FIG. 1, is adapted for connection with the stern of a small pleasure boat 4 of the "inboard-outboard" type wherein the motor (not illustrated) is mounted inboard adjacent the stern and the propeller 6 is connected to the motor by means of a steerable assembly 8. The rack 2 includes a generally horizontal rectangular frame 10 having a width substantially equal to the width of the boat stern and including forward bar 12, rearward bar 14 and side bars 16 which bars are formed of angle iron and are welded together at the ends thereof. In order to secure the rack 2 to the boat stern, connecting means 17 are provided including a transverse rod 18 rigidly connected to the frame 10 adjacent the front bar 12. The ends of rod 18 extend beyond each side of the frame 10, respectively, and are received in mounting brackets 20 fixedly secured to the boat stern adjacent the upper portion thereof.

To support and maintain the frame in a horizontal position, bracing means 21 are provided including a pair of longitudinally extending struts 22 and 24 each of which is connected at its rearward end with the rearward bar 14 of the frame. Each strut extends forwardly of and generally angularly downwardly relative to the frame for engagement at its forward extremity with the lower portion of the boat stern. A pair of vertical connecting rods 25 and 26 are provided, each of which is connected at its upper end to the forward bar 12 and at its lower end with struts 22 and 24, respectively.

A pair of disks 28 and 30 are mounted on the forward extremities of struts 22 and 24, respectively, in a position substantially co-planar with the surface of the stern. Because disks 28 and 30 have a diameter which is greater than the diameter of the struts, the forces transmitted into the stern from the struts are distributed over an area substantially greater than the cross sectional area of the struts.

As illustrated in FIG. 1, frame 10 includes a pair of intermediate bars 32 and 34 extending between the forward bar 12 and rearward bar 14 of the frame. The forward ends of bars 32 and 34 are connected with the upper ends of connecting rods 25 and 26 to form a hook-like connection over transverse rod 18, thereby providing a strong and reliable connection with the boat stern.

Figure 2:
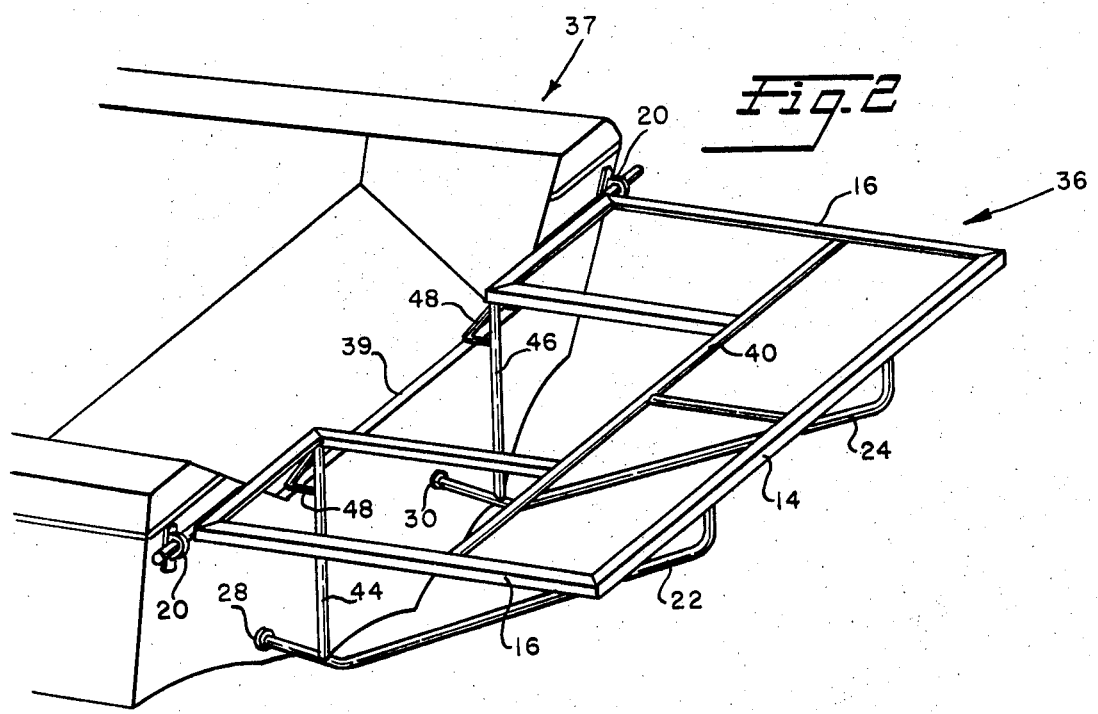
FIG. 2 is a perspective view illustrating a boat rack in accordance with a second embodiment of this invention adapted for mounting on the stern of an outboard type boat.

In FIGS. 2-4 a second rack 36 is illustrated wherein the same numerals indicate those elements of the rack which are identical to the rack illustrated in FIG. 1. Rack 36 is particularly adapted for mounting on an "outboard" type boat 37 including an upper central recess in the boat stern having a lower edge portion 39 which is adapted to support an outboard motor (omitted from the drawing).

As best illustrated in FIG. 3, the frame of rack 36 contains a rearwardly extending recess along the forward bar 38 of the frame. The recess is adapted to receive an outboard motor, whereby rack 36 may be mounted on the stern without interferring with the operation of an outbaard motor also mounted thereon. A transverse bar 40 connected with and extending between side bars 16 forms the rearward edge of the recess and is spaced from 8 to 10 inches from rearward bar 14 of the frame. To form the connecting means for rack 36, a pair of dowels 42 are welded to forward bar 38 in a position to extend outwardly from the sides of rack 36 and are adapted to be received in a pair of brackets 20 (illustrated in FIG. 2) mounted on the upper portion of the stern.

Rack 36 includes a pair of vertical connecting rods 44 and 46, the shape of which is best illustrated in FIG. 4. Rods 44 and 46 are connected to forward bar 38 adjacent the rearwardly extending recess and include a shoulder portion 48 extending in the forward direction and positioned to engage the lower edge portion 39 of the central recess. By this arrangement, each side of the rack is supported at three points by the stern, i.e., bracket 20, disk 28 or 30 and shoulder 48, whereby an exceedingly strong support can be formed even though the rack may be constructed of relatively light weight materials.

In operation a loaded trawl net may be hauled up onto rack 2 or 36 and supported thereon while the contents of the net are sorted and brought aboard the boat. Accordingly, the necessity for hauling a trawling net over the side of a fishing boat has been eliminated, thereby preventing the marring and scratching of the fishing boat which has occurred heretofore and avoiding the necessity for removing mud and refuse which normally accumulates when loaded trawling nets are sorted onboard a fishing boat.

What is claimed is:

1. A rack for supporting a fish net rearwardly from the stern of a fishing boat, comprising
   a. a generally horizontal rectangular frame (10);
   b. means (17) for connecting the forward edge portion of said frame with the upper edge portion of the stern; and
   c. bracing means (21) supporting said frame relative to the stern, said bracing means including first and second laterally spaced generally longitudinally extending struts (22, 24) each connected at its rearward end with the rearward portion of said frame, each of said struts extending forwardly of and generally angularly downwardly relative to said frame for engagmment at its forward extremity with the lower portion of the stern, whereby said struts maintain said frame in a horizontal plane when subjected to the weight of a fish net, thereby to allow the contents of the fish net to be sorted and brought aboard the fishing boat, and wherein said bracing means includes first and second vertical connecting rods (24, 26) each connected at its upper end with said forward edge of said frame and at its lower end with said first and second struts, respectively, wherein said bracing means further includes first and second disks mounted on said forward extremities of said first and second struts in a position substantially coplanar with the outer surface of the stern, respectively, said disks having a diameter substantially greater than the diameter of said struts, whereby the forces transmitted into the stern from said struts are distributed over an area substantially greater than the cross sectional area of said struts, and said disks being free from any mechanical connection with said stern.

* * * * *